(12) United States Patent
Tsai et al.

(10) Patent No.: US 12,366,689 B2
(45) Date of Patent: *Jul. 22, 2025

(54) OPTICAL LENS DEVICE HAVING AN ETCHED POLARIZATION MINIATURE STRUCTURE AND METHOD THEREOF

(71) Applicant: FORESIGHT OPTICAL LTD., Tainan (TW)

(72) Inventors: Yue-Chang Tsai, Tainan (TW); Tien-Shu Wu, Tainan (TW); Yen-Ting Wu, Tainan (TW); Lai-Chun Chou, Tainan (TW)

(73) Assignee: FORESIGHT OPTICAL LTD., Tainan (TW)

( * ) Notice: Subject to any disclaimer, the term of this patent is extended or adjusted under 35 U.S.C. 154(b) by 447 days.

This patent is subject to a terminal disclaimer.

(21) Appl. No.: 17/832,425

(22) Filed: Jun. 3, 2022

(65) Prior Publication Data

US 2022/0390653 A1    Dec. 8, 2022

(30) Foreign Application Priority Data

Jun. 3, 2021 (TW) ................. 110120289

(51) Int. Cl.
*G02B 5/18* (2006.01)
*G02B 3/00* (2006.01)

(52) U.S. Cl.
CPC ......... *G02B 5/1814* (2013.01); *G02B 3/0025* (2013.01)

(58) Field of Classification Search
None
See application file for complete search history.

(56) References Cited

U.S. PATENT DOCUMENTS

| | | | | |
|---|---|---|---|---|
| 5,258,871 A * | 11/1993 | Gupta | ............... | G02B 27/4261 |
| | | | | 359/569 |
| 8,675,279 B2 * | 3/2014 | Iizuki | ...................... | G02B 5/18 |
| | | | | 359/569 |
| 11,099,307 B2 * | 8/2021 | Chakmakjian | ....... | G02B 3/0037 |
| 2005/0277063 A1 * | 12/2005 | Wang | ................... | G02B 5/3025 |
| | | | | 430/311 |
| 2006/0177571 A1 * | 8/2006 | Kumai | ................... | B82Y 20/00 |
| | | | | 427/372.2 |
| 2015/0268390 A1 * | 9/2015 | Teng | ..................... | G02B 5/045 |
| | | | | 359/834 |

* cited by examiner

*Primary Examiner* — Robert E. Tallman
(74) *Attorney, Agent, or Firm* — Ying-Ting Chen; Law Office of Michael Chen (57) ABSTRACT

An optical lens device includes an optical substrate layer, an etched miniature-structure polarization layer and an etched miniature surface structure. The optical substrate layer is provided with a first surface and a second surface and a ray of light passes through the optical substrate layer. The etched miniature-structure polarization layer is provided on the first surface or the second surface of the optical substrate layer. The etched miniature surface structure is etched to form the miniature-structure etched polarization layer and provides a characteristic of optical polarization in the etched miniature-structure polarization layer. The etched miniature surface structure of the etched miniature-structure polarization layer provides an effect of optical polarization to the ray of light while passing through it.

20 Claims, 4 Drawing Sheets

OPTICAL LENS DEVICE HAVING AN ETCHED POLARIZATION MINIATURE STRUCTURE AND METHOD THEREOF

BACKGROUND OF THE INVENTION

1. Field of the Invention

The present invention relates to an optical lens device having an etched polarization miniature structure and method thereof. Particularly, the present invention relates to the optical lens device having an etched polarization microstructure and method thereof. More particularly, the present invention relates to the optical lens device having an etched polarization miniature pattern structure or microstructure and operation or manufacturing method thereof.

2. Description of the Related Art

PCT (Patent Cooperation Treaty) Publication No. WO-2007/0131271, entitled "Microlithography projection optical system, method for manufacturing a device and method to design an optical surface," discloses a microlithography projection optical system, a manufacturing method thereof and a design method for an optical surface on a substrate.

An etched-surface substrate device includes a substrate surface and an etched nano-structure, with the etched nano-structure of the etched-surface substrate device selectively being processed by the above-mentioned microlithography projection optical system and the above-mentioned manufacturing method thereof on the substrate surface.

Further, U.S. Patent Application Publication No. US-20150049319, entitled "Microlithography projection optical system, tool and method of production," also discloses a microlithography projection optical system, a tool thereof and a method of production.

Also, an etched-surface substrate device includes a substrate surface and an etched nano-structure, with the etched nano-structure of the etched-surface substrate device selectively being processed by the above-mentioned microlithography projection optical system and the above-mentioned manufacturing method thereof on the substrate surface.

However, each above-mentioned etched nano-structure of the etched-surface substrate device is not an optical grating structure for polarization such that it cannot be possibly performed as an optical polarization mechanism of lens devices or further successfully modified to provide an optical polarization mechanism of lens devices.

Further, Taiwanese Patent Publication No. TW-556286, entitled "Manufacturing method of micro lens," discloses a manufacturing method of producing micro lens for an optical device comprises: coating a thermoplastic organic material layer on a flat substrate or adhering the thermoplastic organic material layer to the flat substrate.

The manufacturing method of producing micro lens for an optical device further comprises: in a laser etching operation, using a laser beam to directly remove some unwanted portions from the thermoplastic organic material layer by vaporization and to thereby remain a desire pellet-like pattern formed thereon.

The manufacturing method of micro lens for producing an optical device further comprises: in softening operation, heat-treating the remained pellet-like pattern of the thermoplastic organic material layer formed on the flat substrate, thereby forming a spherical surface or a cambered surface on a surface of the thermoplastic organic material layer.

The manufacturing method of producing micro lens for an optical device further comprises: in plating operation, plating a conductive metal thin layer on the surface of the thermoplastic organic material layer which is further provided to form an injection mold mechanism, with cooperating with an injection molding machine, in an injection operation, to produce a substrate panel which is formed with a micro lens.

However, the above-mentioned injection mold mechanism and the manufacturing method thereof or the above substrate panel with the micro lens produced thereby cannot be possibly performed as an optical polarization mechanism of lens devices or further successfully modified to provide an optical polarization mechanism of lens devices.

Further, Taiwanese Patent Application Publication No. TW-201041712, entitled "Mold core, mold apparatus and method for press-molding micro concave lens array," discloses a mold core for a press-molding micro concave lens array. The mold core has an end surface on which a plurality of spacers is formed.

Each of spacers has a top surface which is formed in an identical level with the end surface of the mold core. Each of spacers further defines a mold cavity therein and can be utilized to form a micro concave lens in press-molding operation.

A convex surface is formed in an inner space of the mold cavity for press-molding operation and is also protruded upward from a bottom surface of the mold cavity. The convex surface also has a highest point which is lower than a top surface of the mold cavity.

However, the above-mentioned mold core, mold apparatus thereof and manufacturing method thereof for the press-molding micro concave lens array cannot be possibly performed as an optical polarization mechanism of lens devices or further successfully modified to provide an optical polarization mechanism of lens devices.

Further, Taiwanese Patent Publication No. TW-1709761, entitled "Optical lens having a laser-induced periodical microstructure," discloses an optical lens having a laser-induced periodical microstructure. The optical lens having the laser-induced periodical microstructure is formed from an optical lens device.

The optical lens is selected from a single-piece member, with the optical lens having a flat surface and a curved surface provided on opposite surfaces thereof. The curved surface of the optical lens is induced by a laser to form a laser-induced periodical surface microstructure.

The laser-induced periodical surface microstructure has a microstructure arrangement and a microstructure size, with the microstructure arrangement formed from a plurality of structure members which are in a periodical arrangement, with the microstructure size formed from a spaced width ranging between 50 nm and 1000 nm, with the microstructure size formed from a height ranging between 50 nm and 500 nm.

However, the above-mentioned laser-induced periodical surface microstructure of the optical lens is not an optical grating structure for polarization such that it cannot be possibly performed as an optical polarization mechanism of lens devices or further successfully modified to provide an optical polarization mechanism of lens devices.

Further, Taiwanese Patent Publication No. TW-I611217, entitled "Lens having microstructures," discloses a lens device having microstructures. The lens device having microstructures has a first surface and a second surface, with the first surface having a central portion thereof.

Provided at the central portion of the first surface is an optical portion which has an optical mechanism portion. Defined around the optical portion is the optical mechanism portion. At least one part of optical mechanism portion is formed with at least one recessed microstructure which has a bottom surface. The bottom surface is a rough surface formed by laser processing.

However, the above-mentioned recessed microstructure of the lens is not an optical grating structure for polarization such that it cannot be possibly performed as an optical polarization mechanism of lens devices or further successfully modified to provide an optical polarization mechanism of lens devices.

Further, Taiwanese Patent Publication No. TW-M519748, entitled "E," discloses a lens device having microstructures. The lens device having microstructures has a first surface and a second surface, with the first surface having a central portion thereof.

Provided at the central portion of the first surface is an optical portion which has an optical mechanism portion. Defined around the optical portion is the optical mechanism portion. At least one part of optical mechanism portion is formed with at least one recessed microstructure which has a bottom surface. The bottom surface is a rough surface formed by laser processing.

The lens device having microstructures defines a longitudinal axis which passes through a center of the lens device. The microstructures is selected from a plurality of annular grooves, a plurality of grooves or a spiral groove. The plurality of annular grooves surround the longitudinal axis and extend along the longitudinal axis. The plurality of annular grooves are concentric annular grooves which are spaced apart among them. The plurality of grooves also surround the longitudinal axis and also extend along the longitudinal axis. The spiral groove also extends along the longitudinal axis to form a spiral structure.

However, the above-mentioned recessed microstructure of the lens is not an optical grating structure for polarization such that it cannot be possibly performed as an optical polarization mechanism of lens devices or further successfully modified to provide an optical polarization mechanism of lens devices.

Further, Taiwanese Patent Application Publication No. TW-201719241, entitled "Eyeglasses having a microstructure of an optical structure," discloses an eyeglasses having a microstructure of an optical structure which comprises a basic lens and a corrective lens.

The basic lens and the corrective lens are combined to form a single piece member which is formed as a single-piece shape lens. The basic lens has a microstructure which includes a plurality of predetermined notches or a concave and convex curved surface. The plurality of predetermined notches are concentric notches and the microstructure of the concave and convex curved surface has various angles.

However, the above-mentioned microstructure of the eyeglasses is not an optical grating structure for polarization such that it cannot be possibly performed as an optical polarization mechanism of lens devices or further successfully modified to provide an optical polarization mechanism of lens devices.

However, there is a need of improving the conventional lens devices for providing an optical grating structure performed as an optical polarization mechanism of lens device. The above-mentioned patents and patent application publications are incorporated herein by reference for purposes including, but not limited to, indicating the background of the present invention and illustrating the situation of the art.

SUMMARY OF THE INVENTION

The primary objective of this invention is to provide an optical lens device having an etched polarization miniature structure and method thereof. A first surface and a second surface are provided on an optical substrate (layer), with chemically etching to form at least one etched miniature surface structure on the first surface or the second surface of the optical substrate to form an etched miniature-structure polarization layer, with a light ray or a light beam passing through the etched miniature surface structure of the optical substrate to generate an optical polarization effect. Advantageously, the optical lens device of the present invention is successful in providing an optical grating structure for polarization, reducing a total thickness of lens device, and further increasing eye comfortability and eye protection.

The optical lens device in accordance with an aspect of the present invention includes:
  an optical substrate having a first surface and a second surface, with rays or a beam of light capable of penetrating through the first and second surfaces of the optical substrate;
  at least one etched miniature-structure polarization layer provided on the first surface or the second surface of the optical substrate, with the ray or the beam of light capable of penetrating through the etched miniature-structure polarization layer; and
  at least one etched miniature surface structure formed on the etched miniature-structure polarization layer to form an etched miniature-structure polarization grating which provides an optical polarization characteristic;
  wherein a polarization effect of the ray or the beam of light is generated while penetrating through the etched miniature-structure polarization grating.

The method of an optical lens device having an etched polarization miniature structure in accordance with an aspect of the present invention includes:
  providing a first surface and a second surface on an optical substrate through which rays or a beam of light to penetrate;
  providing at least one etched miniature-structure polarization layer on the first surface or the second surface of the optical substrate, with the ray or the beam of light capable of penetrating through the etched miniature-structure polarization layer;
  operating an etching system to etch at least one etched miniature surface structure on the etched miniature-structure polarization layer to form an etched miniature-structure polarization grating which provides an optical polarization characteristic; and
  generating a polarization effect of the ray or the beam of light while penetrating through the etched miniature-structure polarization grating.

In a separate aspect of the present invention, the optical substrate is selected from a single-layer optical substrate or a multiple-complex-layer optical substrate.

In a further separate aspect of the present invention, the etched miniature surface structure is selected from a sawtooth-shaped miniature structure, a wavy-shaped miniature structure, a groove-shaped miniature structure, a concave-shaped miniature structure, a prism-shaped miniature structure, a convex-shaped miniature structure and combinations thereof.

In yet a further separate aspect of the present invention, the etched miniature surface structure is formed from a predetermined pattern.

In yet a further separate aspect of the present invention, the predetermined pattern is selected from a plurality of concentric rings, a plurality of railings, a plurality of letters and combinations thereof.

In yet a further separate aspect of the present invention, the optical substrate and the etched miniature-structure polarization layer are combined to form as a single-layer optical substrate.

In yet a further separate aspect of the present invention, the etched miniature surface structure is selected from a regular-distributed miniature surface structure or an irregular-distributed miniature surface structure.

In yet a further separate aspect of the present invention, the etched miniature surface structure is protruded from the first surface or the second surface of the optical substrate.

In yet a further separate aspect of the present invention, the etched miniature surface structure is recessed in the first surface or the second surface of the optical substrate.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that an optical lens device having an optical lens device having an etched polarization miniature structure and operation or manufacturing method thereof in accordance with the preferred embodiment of the present invention can be applicable to various glasses (including rimless glasses), various sunglasses, various smart glasses, various sport glasses (including motorcycle-riding glasses), various goggles, various 3D glasses devices, various VR wearable glasses devices, various AR wearable glasses devices or other optical devices such as sensor lens devices, camera lens devices, computer display glasses or TV screen glasses, which are not limitative of the present invention.

Figure 1:
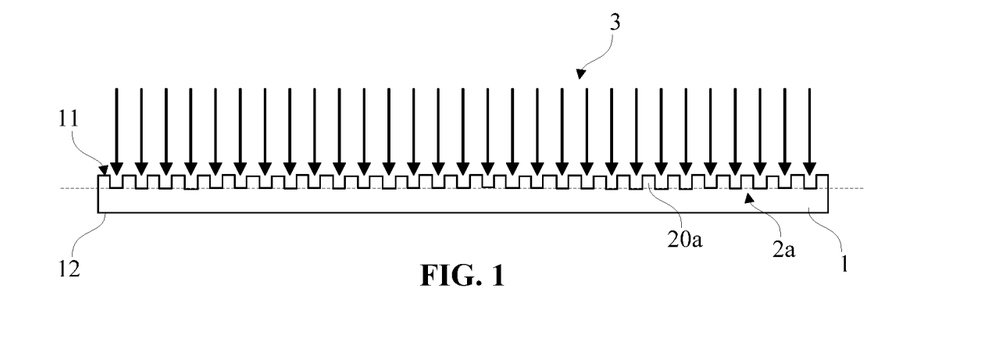
FIG. 1 is a schematic side view of an optical lens device having an etched polarization miniature structure in accordance with a first preferred embodiment of the present invention.

FIG. 1 shows a schematic side view of an optical lens device having an etched polarization miniature structure in accordance with a first preferred embodiment of the present invention. Referring now to FIG. 1, the optical lens device in accordance with the first preferred embodiment of the present invention includes an optical substrate (optical substrate layer) 1, at least one first etched miniature-structure polarization layer 2a, at least one first etched miniature surface structure 20a or at least one first etched microstructure.

With continued reference to FIG. 1, by way of example, the optical substrate 1 is selected from a single-layer optical substrate or a multiple-complex-layer optical substrate, with the optical substrate 1 having a uniform thickness selectively made of a glass material, a plastic material, an eco-friendly plastic material, a macromolecule material, a PC (polycarbonate) material, a PMMA (poly(methyl methacrylate)) material, a nylon material or similar materials.

Still referring to FIG. 1, by way of example, the optical substrate 1 is selected from another polarization layer, an anti-reflection layer, a photochromic material, anti-blue layer, anti-blue UV layer, an anti-infrared layer or other functional layer (e.g., anti-fog layer or scratch resistant layer) or combinations thereof.

Figure 2:
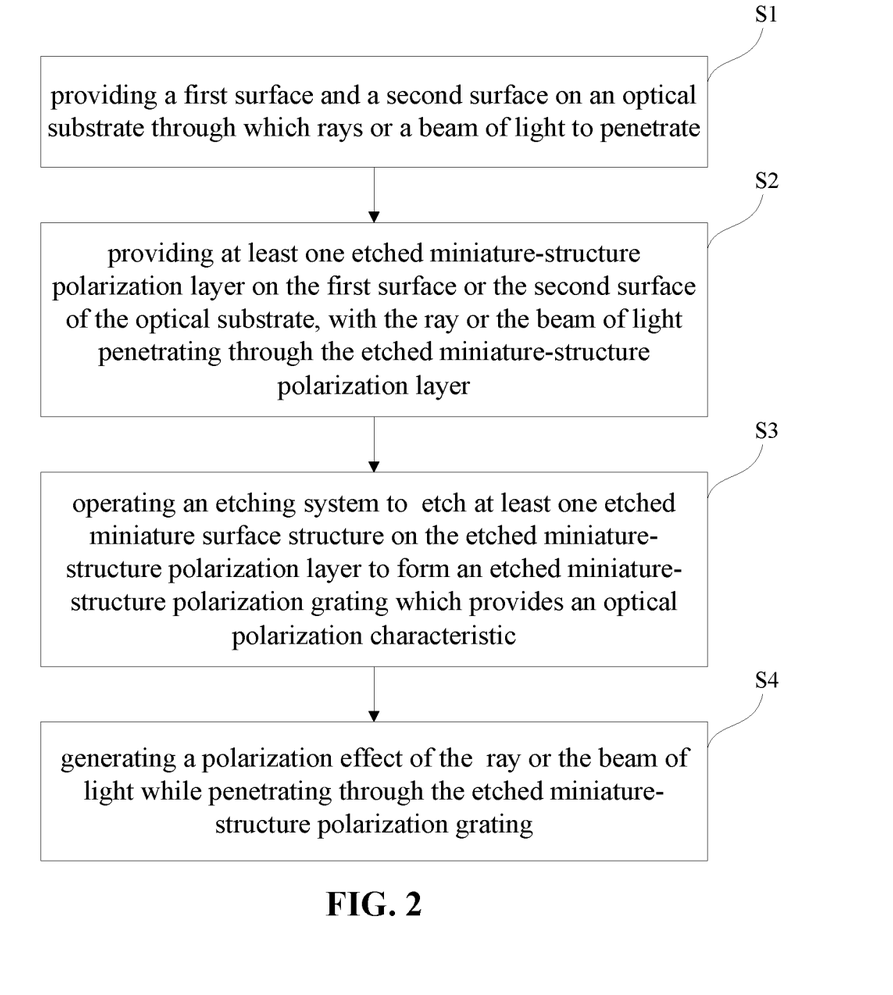
FIG. 2 is a flow chart of a method of an optical lens device having an etched polarization miniature structure in accordance with a preferred embodiment of the present invention.

Still referring to FIG. 1, by way of example, the first etched miniature-structure polarization layer 2a and the first etched miniature surface structure 20a have a miniature specification (e.g., miniature width, miniature depth, miniature height or other sizes) to form a miniature grating structure, thereby the first etched miniature surface structure 20a providing a function of optical polarization in the first etched miniature-structure polarization layer 2a FIG. 2 is a flow chart of a method of an optical lens device having an etched polarization miniature structure in accordance with a preferred embodiment of the present invention. Turning now to FIGS. 1 and 2, by way of example, the method of an optical lens device having an etched polarization miniature structure includes the step S1: providing a first surface (i.e., front-side surface) 11 and a second surface (i.e., rear-side surface) 12 on the first optical substrate 1 through which rays or a beam of light can be penetrated.

Still referring to FIGS. 1 and 2, by way of example, the method of an optical lens device having an etched polarization miniature structure includes the step S2: providing one or more of the first etched miniature-structure polarization layers 2a on the first surface (i.e., front-side surface) 11 or the second surface (i.e., rear-side surface) 12 of the optical substrate 1 in an integrated manner with similar or different refractive indexes or colors, with the ray or the beam of light capable of penetrating through the first surface and second surface of the etched miniature-structure polarization layer 2a. The first etched miniature-structure polarization layer 2a is integrated into the optical substrate 1 (e.g., between front and rear surfaces) which is selected from a single-layer optical substrate or a multiple-complex-layer optical substrate.

With continued reference to FIGS. 1 and 2, by way of example, in another preferred embodiment, two first etched miniature-structure polarization layers 2a are provided on the first surface (i.e., front-side surface) 11 and the second surface (i.e., rear-side surface) 12 of the optical substrate 1 in an integrated manner to form a double-sided optical polarization substrate, with the two first etched miniature-structure polarization layers 2a provide optical polarization in different angular directions of light.

Still referring to FIGS. 1 and 2, by way of example, the method of an optical lens device having an etched polarization miniature structure includes the step S3: operating an etching system with an etching procedure (e.g., microlithography or the likes) to etch the first etched miniature surface structure 20a suitably on the first etched miniature-structure polarization layer 2a to form an etched miniature-structure polarization grating (or grating barrier) which provides an optical polarization characteristic and a degree of light transmittance.

Still referring to FIGS. 1 and 2, by way of example, the etching procedure may be selected from a plasma etching procedure, a dielectric materials reactive ion etching procedure, a multi-crystalline silicon etching procedure or other suitable etching procedures to form the first etched miniature-structure polarization layer 2a and the first etched miniature surface structure 20a.

Still referring to FIGS. 1 and 2, by way of example, the optical substrate 1 and the first etched miniature-structure polarization layer 2a (first etched miniature surface structure 20a) made of similar or different refractive indexes or colors of materials are formed in an integrated manner to form as a single layer to reduce a total thickness and may be made of same material.

Still referring to FIGS. 1 and 2, by way of example, the method of an optical lens device having an etched polarization miniature structure includes the step S4: generating a polarization effect of the ray or the beam of light while penetrating through the etched miniature-structure polarization grating of the first etched miniature-structure polarization layer 2a.

Still referring to FIGS. 1 and 2, by way of example, the first etched miniature surface structure 20a with a profile is selected from a sawtooth-shaped miniature structure or the like, with the first etched miniature surface structure 20a selected from a regular-distributed miniature surface structure or an irregular-distributed miniature surface structure, with the first etched miniature surface structure 20a protruded from the first surface 11 or the second surface 12 of the optical substrate 1, as best shown in dotted line in FIG. 1.

Figure 3:
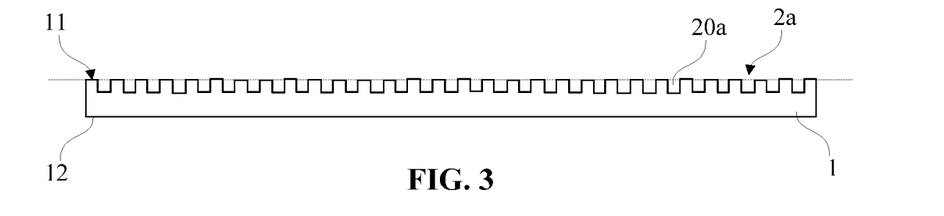
FIG. 3 is a schematic side view of an optical lens device having an etched polarization miniature structure in accordance with a second preferred embodiment of the present invention.

FIG. 3 is a schematic side view of an optical lens device having an etched polarization miniature structure in accordance with a second preferred embodiment of the present invention. Turning now to FIG. 3, in comparison with the first embodiment, the optical lens device in accordance with the second preferred embodiment has the first etched miniature surface structure 20a recessed in the first surface 11 or the second surface 12 of the optical substrate 1, as best shown in dotted line in FIG. 3.

Figure 4:
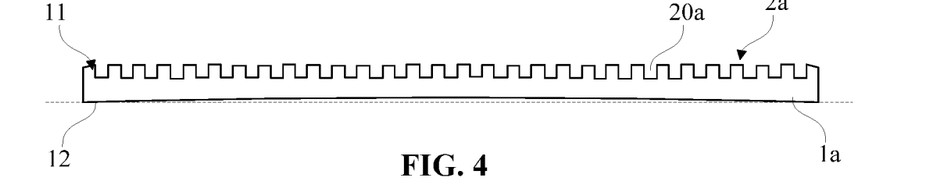
FIG. 4 is a schematic side view of an optical lens device having an etched polarization miniature structure in accordance with a third preferred embodiment of the present invention.

FIG. 4 is a schematic side view of an optical lens device having an etched polarization miniature structure in accordance with a third preferred embodiment of the present invention. Turning now to FIG. 4, in comparison with the first embodiment, the optical lens device in accordance with the third preferred embodiment is formed with a curved optical substrate 1a which has at least one curved surface, as best shown in dotted line in FIG. 4.

Figure 5:
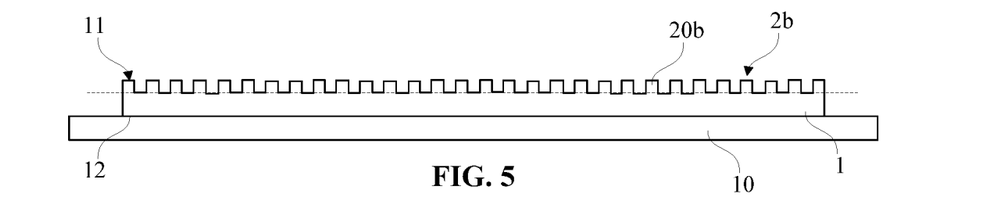
FIG. 5 is a schematic side view of an optical lens device having an etched polarization miniature structure in accordance with a fourth preferred embodiment of the present invention.

FIG. 5 is a schematic side view of an optical lens device having an etched polarization miniature structure in accordance with a fourth preferred embodiment of the present invention. Turning now to FIG. 5, in comparison with the first embodiment, the optical lens device in accordance with the fourth preferred embodiment includes the optical substrate 1 combined with a protective optical substrate 10 which is selected from an anti-reflection layer, a photochromic material, anti-blue layer, anti-blue UV layer, an anti-infrared layer or other functional layer (e.g., anti-fog layer or scratch resistant layer) or combinations thereof.

Still referring to FIG. 5, by way of example, the second etched miniature surface structure 20b of the second etched miniature-structure polarization layer 2b is etched to form on an ultra-thin optical substrate 1 which is further supported and protected by the protective optical substrate 10.

Still referring to FIG. 5, by way of example, in a preferred embodiment, the optical substrate 1 is initially extruded or thermal-extruded to form a semi-processed miniature structure which is further etched to form a fully-processed miniature structure to provide complex miniature structures.

Figure 6:
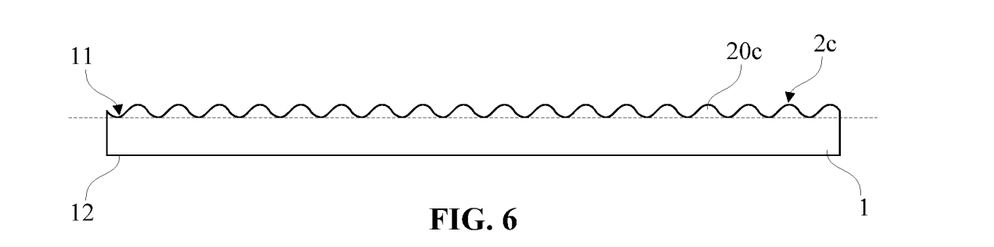
FIG. 6 is a schematic side view of an optical lens device having an etched polarization miniature structure in accordance with a fifth preferred embodiment of the present invention.

FIG. 6 is a schematic side view of an optical lens device having an etched polarization miniature structure in accordance with a fifth preferred embodiment of the present invention. Turning now to FIG. 6, in comparison with the first embodiment, the optical lens device in accordance with the fifth preferred embodiment includes the optical substrate 1 formed with a third etched miniature-structure polarization layer 2c and a third etched miniature surface structure 20c which has a profile of wavy to form a wavy-shaped miniature structure.

Figure 7:
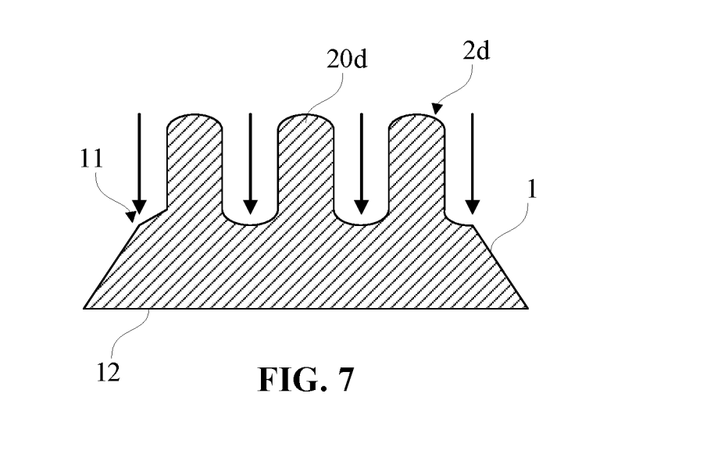
FIG. 7 is a schematic side view of an optical lens device having an etched polarization miniature structure in accordance with a sixth preferred embodiment of the present invention.

FIG. 7 is a schematic side view of an optical lens device having an etched polarization miniature structure in accordance with a sixth preferred embodiment of the present invention. Turning now to FIG. 7, in comparison with the first embodiment, the optical lens device in accordance with the sixth preferred embodiment the optical substrate 1 formed with a fourth etched miniature-structure polarization layer 2d and a fourth etched miniature surface structure 20d which has a profile to form a groove-shaped miniature structure. The fourth etched miniature surface structure 20d can be also selected from a concave-shaped miniature structure, a prism-shaped miniature structure, a convex-shaped miniature structure and combinations thereof.

Figure 8A:
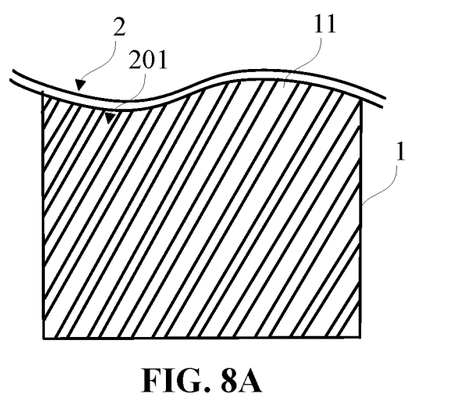
FIG. 8A is a schematic side view of an optical lens device having an etched polarization miniature structure with a first pattern of miniature surface structure in accordance with a preferred embodiment of the present invention.

FIG. 8A is a schematic side view of an optical lens device having an etched polarization miniature structure with a first pattern of miniature surface structure in accordance with a preferred embodiment of the present invention. Turning now to FIG. 8A, by way of example, the optical substrate 1 selectively has a pattern to form an etched miniature-structure polarization layer 2, with the predetermined pattern formed from a first miniature structure pattern 201 which is an inclined-groove pattern.

Figure 8B:
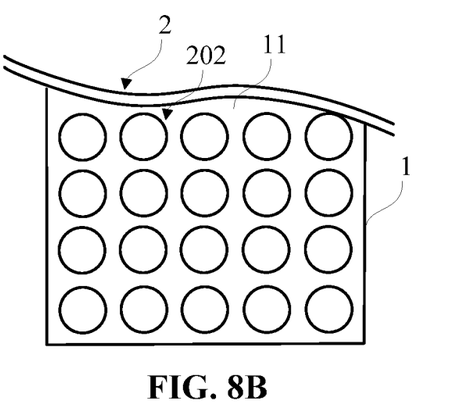
FIG. 8B is a schematic side view of an optical lens device having an etched polarization miniature structure with a second pattern of miniature surface structure in accordance with a preferred embodiment of the present invention.

FIG. 8B is a schematic side view of an optical lens device having an etched polarization miniature structure with a second pattern of miniature surface structure in accordance with a preferred embodiment of the present invention. Turning now to FIG. 8B, by way of example, the optical substrate 1 selectively has a pattern to form an etched miniature-structure polarization layer 2, with the predetermined pattern formed from a second miniature structure pattern 202 which is a circle-array pattern.

Figure 8C:
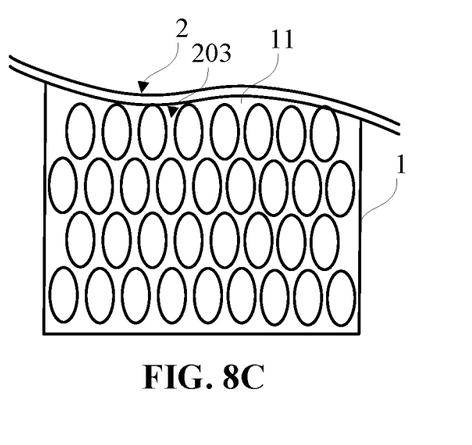
FIG. 8C is a schematic side view of an optical lens device having an etched polarization miniature structure with a third pattern of miniature surface structure in accordance with a preferred embodiment of the present invention.

FIG. 8C is a schematic side view of an optical lens device having an etched polarization miniature structure with a third pattern of miniature surface structure in accordance with a preferred embodiment of the present invention. Turning now to FIG. 8C, by way of example, the optical substrate 1 selectively has a pattern to form an etched miniature-structure polarization layer 2, with the predetermined pattern formed from a third miniature structure pattern 203 which is an ellipse-array pattern.

Figure 8D:
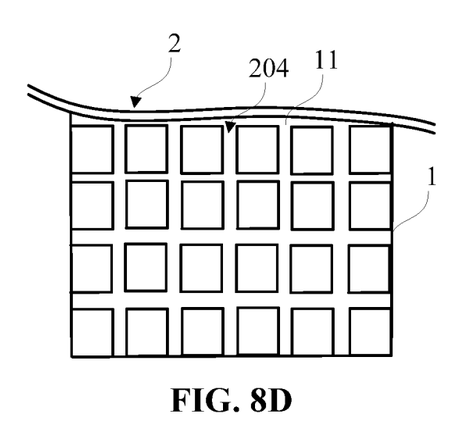
FIG. 8D is a schematic side view of an optical lens device having an etched polarization miniature structure with a fourth pattern of miniature surface structure in accordance with a preferred embodiment of the present invention.

FIG. 8D is a schematic side view of an optical lens device having an etched polarization miniature structure with a fourth pattern of miniature surface structure in accordance with a preferred embodiment of the present invention. Turning now to FIG. 8D, by way of example, the optical substrate 1 selectively has a pattern to form an etched miniature-structure polarization layer 2, with the predetermined pattern formed from a fourth miniature structure pattern 204 which is a square-array pattern.

Referring back to FIGS. 8A to 8D, by way of example, in another embodiment, the optical substrate 1 is selected from a plurality of concentric rings, a plurality of railings, a plurality of letters and combinations thereof.

Although the invention has been described in detail with reference to its presently preferred embodiment, it will be understood by one of ordinary skills in the art that various modifications can be made without departing from the spirit and the scope of the invention, as set forth in the appended claims.

What is claimed is:

1. A wearable optical lens device for eye protection comprising:
    an optical substrate of wearable lens device having a first surface and a second surface, with rays or a beam of light capable of penetrating through the first and second surfaces of the optical substrate of wearable lens device;
    at least one etched miniature-structure polarization layer provided on the first surface of the optical substrate of wearable lens device, with reducing a total thickness of wearable lens device, with the ray or the beam of light capable of penetrating through the etched miniature-structure polarization layer; and
    at least one etched miniature surface structure formed on the etched miniature-structure polarization layer to form an etched miniature-structure polarization grating which provides an optical polarization characteristic;
    wherein a polarization effect of the ray or the beam of light is generated on wearer's eyes while penetrating through the etched miniature-structure polarization grating, with increasing eye comfortability and eye protection.

2. The wearable optical lens device for eye protection as defined in claim 1, wherein the optical substrate of wearable lens device is selected from a single-layer optical substrate or a multiple-complex-layer optical substrate.

3. The wearable optical lens device for eye protection as defined in claim 1, wherein the etched miniature surface structure is selected from a sawtooth-shaped miniature structure, a wavy-shaped miniature structure, a groove-shaped miniature structure, a concave-shaped miniature structure, a prism-shaped miniature structure, a convex-shaped miniature structure and combinations thereof.

4. The wearable optical lens device for eye protection as defined in claim 1, wherein the etched miniature surface structure is formed from a predetermined pattern.

5. The wearable optical lens device for eye protection as defined in claim 4, wherein the predetermined pattern is selected from a plurality of concentric rings, a plurality of railings, a plurality of letters and combinations thereof.

6. The wearable optical lens device for eye protection as defined in claim 1, wherein the optical substrate of wearable lens device and the etched miniature-structure polarization layer are combined to form as a single-layer optical substrate.

7. The wearable optical lens device for eye protection as defined in claim 1, wherein the etched miniature surface structure is selected from a regular-distributed miniature surface structure or an irregular-distributed miniature surface structure.

8. The wearable optical lens device for eye protection as defined in claim 1, wherein the etched miniature surface structure is protruded from the first surface of the optical substrate of wearable lens device.

9. The wearable optical lens device for eye protection as defined in claim 1, wherein the etched miniature surface structure is recessed in the first surface of the optical substrate of wearable lens device.

10. The wearable optical lens device for eye protection as defined in claim 1, wherein another etched miniature-structure polarization layer provided on the second surface of the optical substrate of wearable lens device to form a double-sided optical polarization substrate.

11. A method for wearable an optical lens device for eye protection comprising:
    providing a first surface and a second surface on an optical substrate of wearable lens device through which rays or a beam of light to penetrate;
    providing at least one etched miniature-structure polarization layer on the first surface of the optical substrate of wearable lens device, with reducing a total thickness of wearable lens device, with the ray or the beam of light capable of penetrating through the etched miniature-structure polarization layer;
    operating an etching system to etch at least one etched miniature surface structure on the etched miniature-structure polarization layer to form an etched miniature-structure polarization grating which provides an optical polarization characteristic; and
    generating a polarization effect of the ray or the beam of light on wearer's eyes while penetrating through the etched miniature-structure polarization grating, with increasing eye comfortability and eye protection.

12. The method for the wearable optical lens device for eye protection as defined in claim 11, wherein the optical substrate of wearable lens device is selected from a single-layer optical substrate or a multiple-complex-layer optical substrate.

13. The method for the wearable optical lens device for eye protection as defined in claim 11, wherein the etched miniature surface structure is selected from a sawtooth-shaped miniature structure, a wavy-shaped miniature structure, a groove-shaped miniature structure, a concave-shaped miniature structure, a prism-shaped miniature structure, a convex-shaped miniature structure and combinations thereof.

14. The method for the wearable optical lens device for eye protection as defined in claim 11, wherein the etched miniature surface structure is formed from a predetermined pattern.

15. The method for the wearable optical lens device for eye protection as defined in claim 14, wherein the predetermined pattern is selected from a plurality of concentric rings, a plurality of railings, a plurality of letters and combinations thereof.

16. The method for the wearable optical lens device for eye protection as defined in claim 11, wherein the optical substrate of wearable lens device and the etched miniature-structure polarization layer are combined to form as a single-layer optical substrate.

17. The method for the wearable optical lens device for eye protection as defined in claim 11, wherein the etched miniature surface structure is selected from a regular-distributed miniature surface structure or an irregular-distributed miniature surface structure.

18. The method for the wearable optical lens device or eye protection as defined in claim 11, wherein the etched miniature surface structure is protruded from the first surface of the optical substrate of wearable lens device.

19. The method for the wearable optical lens device for eye protection as defined in claim 11, wherein the etched miniature surface structure is recessed in the first surface of the optical substrate of wearable lens device.

20. The method for the wearable optical lens device for eye protection as defined in claim 11, wherein another etched miniature-structure polarization layer provided on the second surface of the optical substrate of wearable lens device to form a double-sided optical polarization substrate.

* * * * *